Nov. 9, 1937.　　　R. B. SIMNING　　　2,098,522
TANK VEHICLE
Filed Dec. 13, 1935　　　4 Sheets-Sheet 1
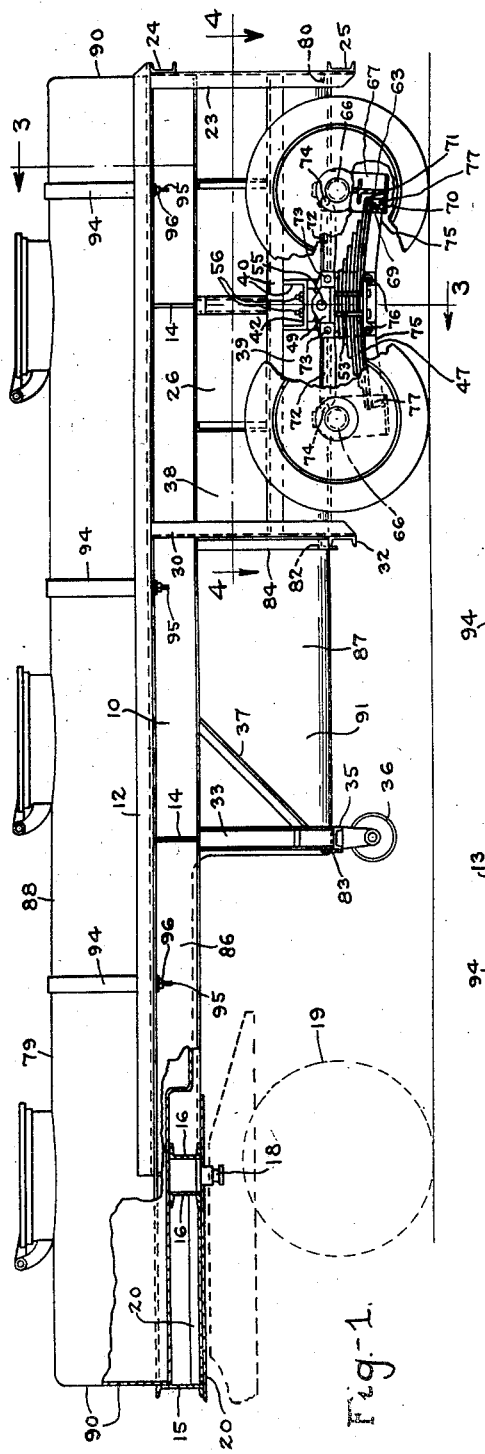
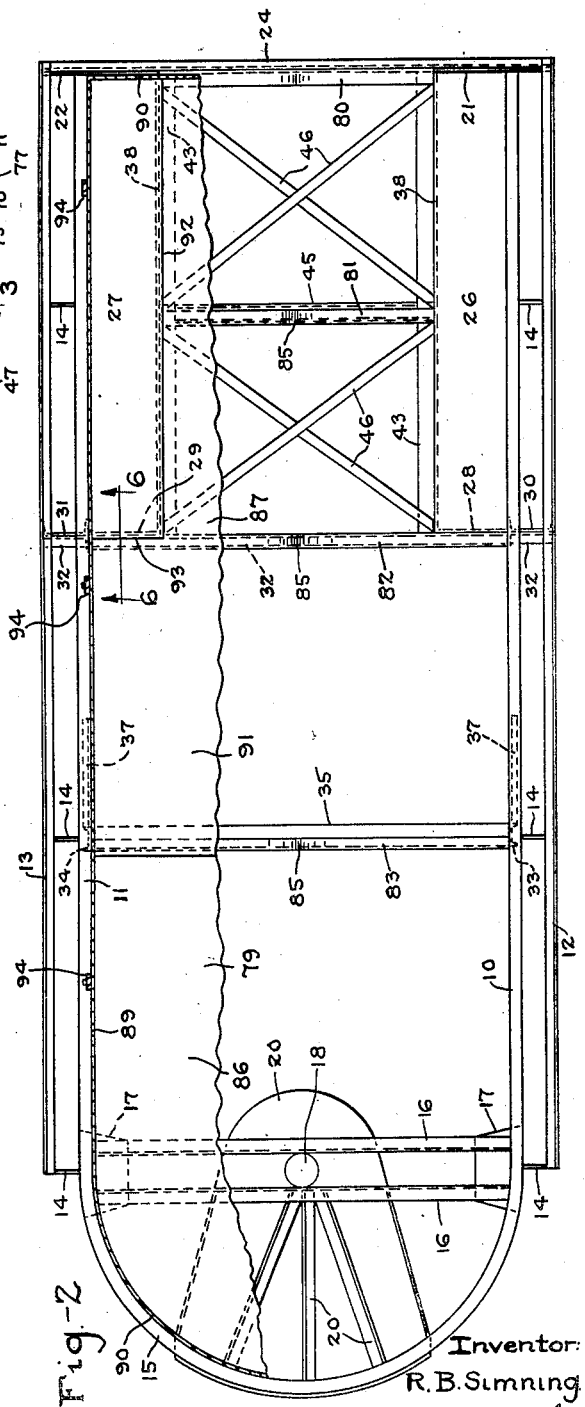
Inventor:
R. B. Simning
By G. H. Braddock
Attorney.

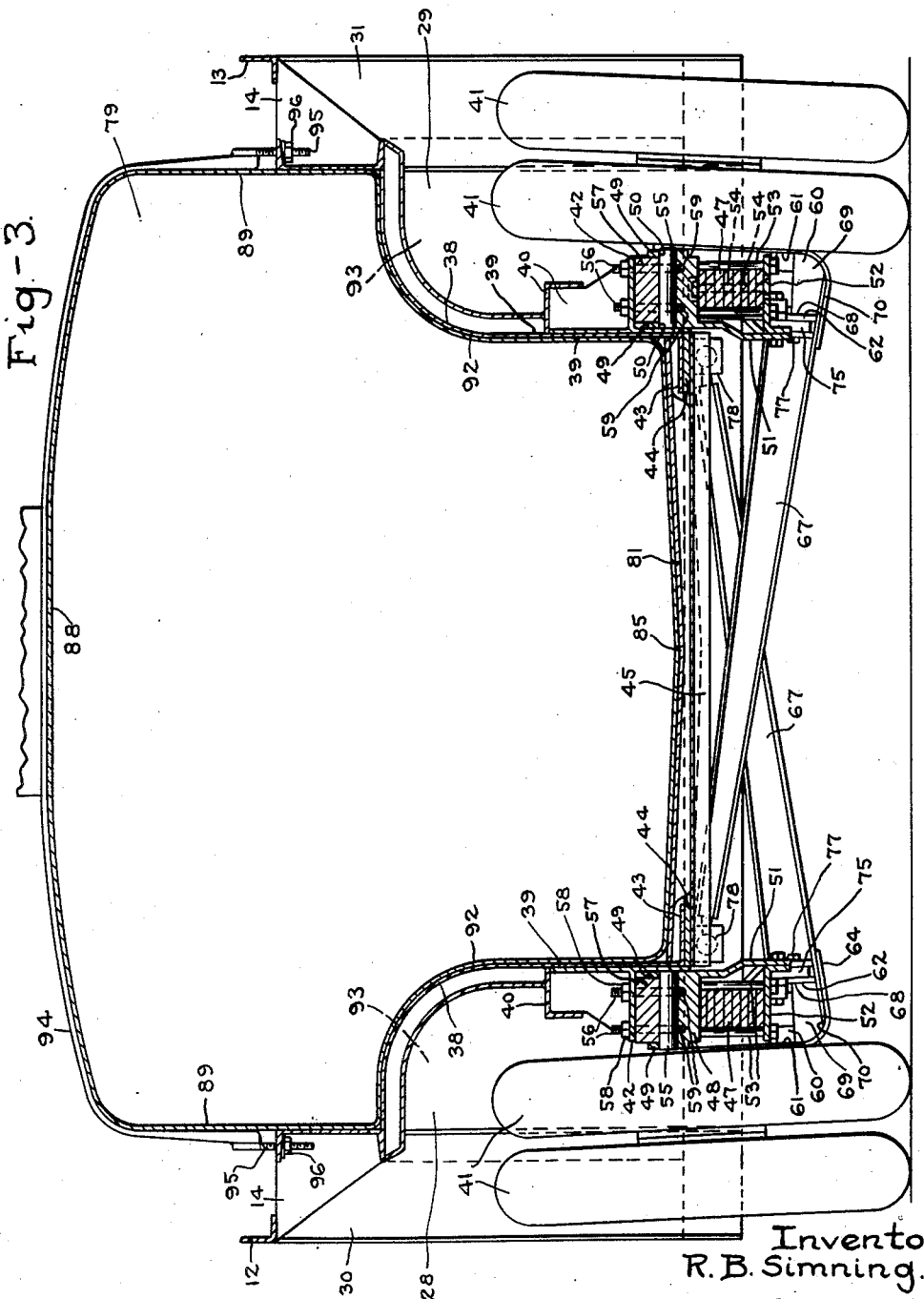

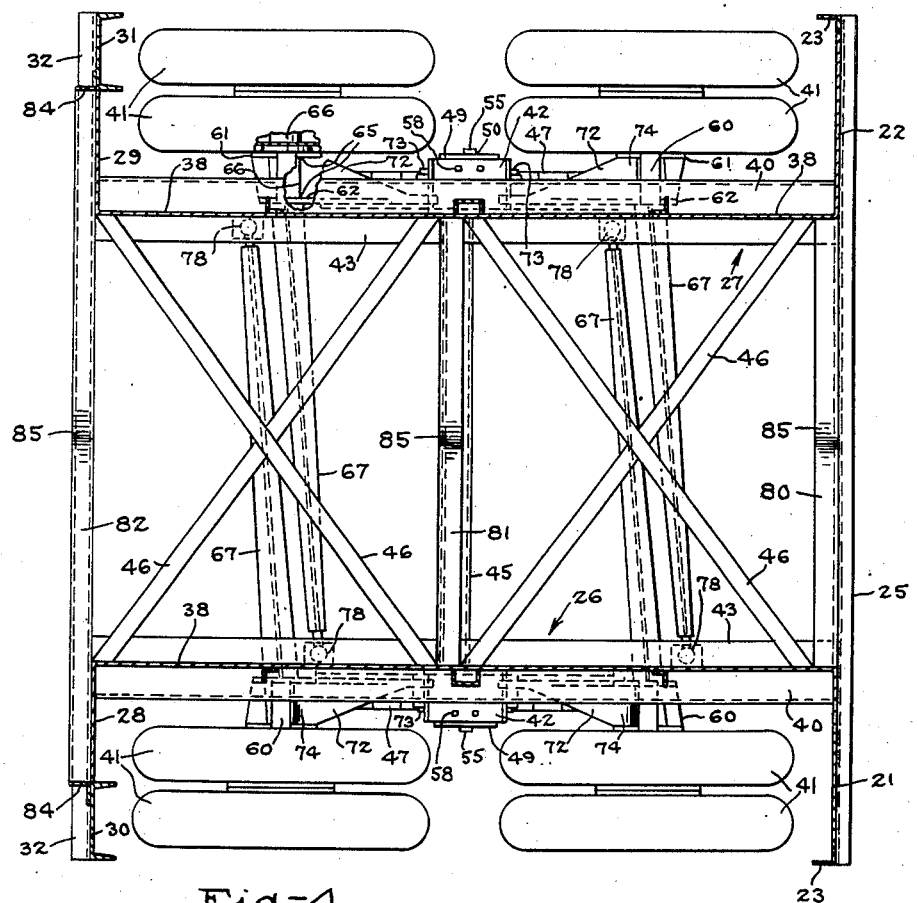

Nov. 9, 1937.  R. B. SIMNING  2,098,522
TANK VEHICLE
Filed Dec. 13, 1935  4 Sheets-Sheet 4
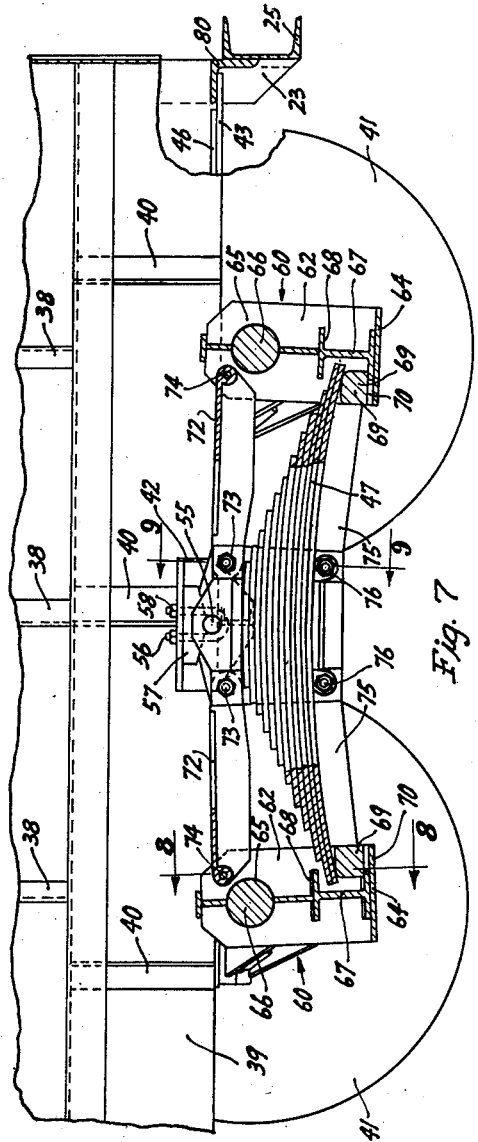
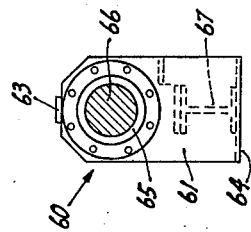
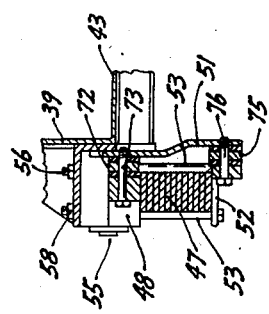
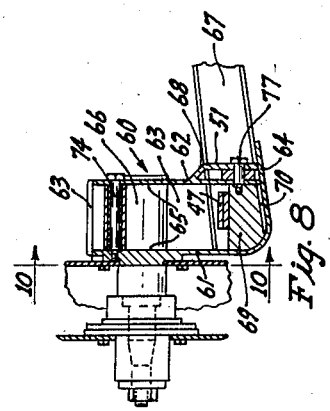
INVENTOR.
R. B. SIMNING
BY G. H. Braddock
ATTORNEY Patented Nov. 9, 1937

2,098,522

UNITED STATES PATENT OFFICE 2,098,522

TANK VEHICLE

Roy B. Simning, Minneapolis, Minn., assignor, by mesne assignments, to himself and Harold J. Murphy, St. Louis Park, Minneapolis, Minn., and George Verne Watson, Minneapolis, Minn.

Application December 13, 1935, Serial No. 54,277

17 Claims. (Cl. 280—5)

This invention relates to a vehicle, and has more especial reference to a vehicle including an oil tank, as, for example, a tank vehicle for placing oil on highways and for other purposes. Features of the invention may have application to any type of vehicle, but specifically, in the present embodiment, I have illustrated and shall describe the invention with reference to what is commonly known as a semi-trailer.

An object of the invention is to provide a vehicle, as, for example, a semi-trailer, which can be employed to transport material or articles of any nature, but which as disclosed is more especially adapted to transport oil or other liquid contained in a tank mounted upon the vehicle, and in which vehicle will be incorporated various improved features and characteristics of construction, novel both as individual entities of the vehicle and in combination, designed to render the vehicle an improvement generally over more or less similar structures heretofore known.

A further object is to provide a tank vehicle, for transporting oil or other material, which will be of unique and improved design and construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view, partially in section and partially broken away, of a tank vehicle in which the features of the invention are incorporated;

Fig. 2 is a plan view of the tank vehicle of Fig. 1, parts being in section, parts being broken away, and parts being omitted;

Fig. 3 is an enlarged, vertical, transverse sectional view, taken as on line 3—3 in Fig. 1;

Fig. 4 is an enlarged, horizontal sectional view, taken as on line 4—4 in Fig. 1, the oil tank being omitted;

Fig. 5 is a fragmentary, forward perspective view detailing features of the tank vehicle;

Fig. 6 is a detail sectional view, taken on line 6—6 in Fig. 2.

Fig. 7 is an enlarged, vertical, longitudinal sectional view detailing features of the tank vehicle;

Fig. 8 is a transverse sectional view, taken as on line 8—8 in Fig. 7;

Fig. 9 is a transverse sectional view, taken as on line 9—9 in Fig. 7; and

Fig. 10 is a detail sectional view, taken as on line 10—10 in Fig. 8.

With respect to the drawings and the numerals of reference thereon, the frame of the vehicle 10 includes longitudinally extending, horizontally disposed main channel bars, denoted 10 and 11, respectively, one at either side of the frame and reaching from the rear of the vehicle to near the front thereof. The flanges of the main channel bars 10 and 11 project outwardly of the frame, or away from each other, and are at elevation just above the wheel housings of the vehicle.

Each main channel bar 10, 11 conveniently supports a longitudinally extending, horizontally disposed guard rail, represented 12 and 13, respectively, said guard rails 12 and 13 being at the outer sides of the main channel bars 10 and 11 in spaced relation thereto, and being integrally attached to said main channel bars by webs 14 each of which desirably may be welded to a main channel bar 10 or 11, as the case may be, as well as to the adjacent guard rail 12 or 13.

All of the channel bars 10, 11, guard rails 12, 13, and webs 14 are of rigid metal. The guard rails 12 and 13 are desirably parallel with the main channel bars 10 and 11, and the webs 14 are in spaced apart relation along the lengths of the main channel bars and guard rails. Obviously, the guard rails and webs thus cooperate to provide strengthening and reinforcing members for the main channel bars.

The forward portions of the main channel bars 10 and 11 are integrally connected by an arc-shaped channel bar 15, which may constitute the forward portion of the vehicle. The flanges of the arc-shaped channel bar 15 project outwardly of the frame, toward the sides and front of the vehicle. The rearward ends of the body or web and the flanges of the arc-shaped channel bar 15 may be welded to the forward ends of the bodies or webs and the flanges of the main channel bars 10 and 11, respectively, the arrangement preferably being such that the bodies or webs and the flanges, respectively, of the channel bars 10, 11 and 15 are in horizontal alinement.

The arc-shaped channel bar 15 consists of the same rigid metal as do the channel bars 10 and 11, and said arc-shaped channel bar 15 is itself a main channel bar of the vehicle, along with the channel bars 10 and 11, all of said channel bars 10, 11, and 15 together constituting a rigid structure extending along the whole lengths of the sides and around the front of the vehicle.

A pair of spaced apart, transverse channel bars 16 near the front of the vehicle are suitably welded to the main channel bars 10, 11, and 15, through the instrumentality of gussets 17 as disclosed, and said channel bars 16 support a downwardly projecting king pin 18 for mounting the vehicle or semi-trailer upon the fifth wheel 19 of a truck or tractor (not shown). The king pin 18 is desirably welded to the transverse channel bars 16 and is at the midwidth of the frame. Said channel bars 16 may be suitably reinforced by additional strengthening pieces 20 welded to all of the channel bars 15 and 16.

Vertical plates, denoted 21 and 22, respectively, one at either corner of the vehicle, are welded to the rearward ends of the main channel bars 10 and 11 and to the guard rails 12 and 13 and extend downwardly below the elevation of said main channel bars, say to about the elevation of the wheel centers. The vertical plates 21 and 22 are composed of rigid metal, and each extends transversely of the vehicle. Said plates 21 and 22 are in spaced apart relation to each other, an outer vertical edge of each plate 21, 22 is situated at the outer side of the adjacent main channel bar 10 or 11, as the case may be, in sightly spaced relation thereto, and the inner vertical edge of each plate 21, 22 is situated at the inner side of the adjacent main channel bar, in slightly spaced relation thereto. The outer portion of each vertical plate 21 and 22 as disclosed integrally supports a narrow flange 23 arranged perpendicular to the plate and extending forwardly of the vehicle. A flange 23 is directly beneath each guard rail 12 and 13 as illustrated.

Upper and lower transversely extending channel bars, denoted 24 and 25, respectively, at the rear of the vehicle, are disposed horizontally and have their opposite end portions welded to the rearward surfaces of the vertical plates 21 and 22, respectively. The upper channel bar 24 is at the elevation of the main channel bars 10 and 11, and the lower channel bar 25 is at the elevation of the lower extremities of the vertical plates 21 and 22; that is, at about the elevation of the wheel centers. The upper ends of said vertical plates 21 and 22 may desirably terminate in about the horizontal plane of the upper flanges of the main channel bars 10 and 11, as disclosed.

Wheel housings, denoted 26 and 27, respectively, for the vehicle or semi-trailer, are at a rearward portion of the vehicle. Said wheel housings may be specifically of a construction to be set forth. They extend inwardly and downwardly from the main channel bars 10 and 11, and are interconnected by transverse structure, including the channel bar 25, at the elevation of lower portions of the vertical plates 21 and 22, at the lowest port of the frame as disclosed. The vertical plates 21 and 22, respectively, are directly at the rear of the wheel housings 26 and 27, and constitute rearward walls of said wheel housings.

Vertical plates, indicated 28 and 29, respectively, one directly at the front of each wheel housing, are welded to intermediate portions of the main channel bars 10 and 11 and extend downwardly below said main channel bars to about the elevation of the wheel centers. The vertical plates 28 and 29 are also composed of rigid metal, and each extends transversely of the vehicle. The plates 28 and 29 are in spaced relation to each other, their inner edges terminating in planes which are coincident with the inner portions of the wheel housings. Vertical channel bars, represented 30 and 31, respectively, are welded to intermediate portions of said main channel bars 10 and 11 and to the guard rails 12 and 13 and extend downwardly below the main channel bars. Also, the inner edge of each channel bar 30 and 31 is welded to the outer edge of the adjacent vertical plate 28 or 29, as the case may be, and the plates 28 and 29 and the channel bars 30 and 31 are in transverse alinement. The flanges of the channel bars 30 and 31 extend rearwardly of the vehicle. The outer flange of each channel bar 30 and 31 is disposed vertically and in longitudinal alinement with the flange 23 at the corresponding side of the vehicle, as disclosed, there being an outer flange of each channel bar 30 directly beneath a guard rail 12 and an outer flange of each channel bar 31 directly beneath a guard rail 13. The lower ends of the channel bars 30 and 31 may desirably terminate flush with the lower ends of the vertical plates 28 and 29, respectively. Said channel bars 30 and 31 are of rigid metal. The vertical plate 28 together with the channel bar 30 constitutes the forward wall of the wheel housing 26, and the vertical plate 29 together with the channel bar 31 constitutes the forward wall of the wheel housing 27.

A transversely extending channel bar, denoted 32, at the front of the wheel housings, is disposed horizontally, and the opposite end portions of said channel bar 32 are welded to the forward surfaces of the vertical plate 28 and channel bar 30 and the vertical plate 29 and channel bar 31, respectively. The horizontal channel bar 32 is at the elevation of the lower portions of plates 28 and 29 and channel bars 30 and 31, as well as at the elevation of channel bar 25, which channel bar 25 is, itself, at about the elevation of the wheel centers, as already mentioned.

Vertical channel bars, indicated 33 and 34, respectively, one at either side of the frame, are welded to the main channel bars 10 and 11 and extend downwardly therefrom at location between the wheel housings 26 and 27 and the king pin 18. A transversely extending member 35, in the horizontal plane of the channel bars 25 and 32, has its opposite ends welded to the lower portions of the vertical channel bars 33 and 34, respectively. Small front wheels for the vehicle or semi-trailer are denoted 36. Said front wheels support the vehicle or semi-trailer when it is removed from the truck or tractor. The small wheels 36 may be carried by the vertical channel bars 33 and 34 and the transversely extending member 35 in a manner forming no part of the present invention. Numeral 37 denotes oblique reinforcing angle pieces for the vertical channel bars 33 and 34, the upper end of each oblique angle piece 37 being welded to a main channel bar 10 or 11 and the lower end of each oblique angle piece being welded to the channel bar 33 or 34 at the corresponding side of the vehice frame.

Each wheel housing 26 and 27 includes a strong, solid curved bracket, or brackets, 38, welded to a main channel bar 10 or 11, as the case may be, and extending downwardly and inwardly, as before mentioned. Also, the rearward portion of each bracket, or brackets, 38 is welded to the vertical plate 21 or 22 at the corresponding side of the vehicle frame, and the forward portion of each bracket, or brackets, 38 is welded to the vertical plate 28 or 29 at the corresponding side of said vehicle frame. Each curved bracket, or brackets, 38 is integral with, or rigidly supports, a vertical plate 39 extending longitudinally of and rigid with the frame, said plates 39 desirably being reinforced as at 40. Each plate 39 in turn supports the mechanism for mounting a set of rear wheels, denoted 41, at each side of the vehicle or frame. In the instance of the mounting mechanism for each set of rear wheels, 42 represents an L-shape bracket having its vertical arm welded to an outer surface of a plate 39 and its horizontal arm extending outwardly. The L-shape brackets 42 may desirably be at the longitudinal centers of the plates 39.

The lower portion of each vertical plate 39 extends inwardly horizontally, as at 43, and a filler member 44 is suitably welded to the lower surface of each inwardly extending portion 43. A transverse channel bar 45, at about the elevation of the channel bars 25 and 32 and the transverse member 35, is disposed horizontally and has its opposite end portions welded to the lower surfaces of the filler members 44. The flanges of the channel bar 45 extend downwardly. Also, horizontal reinforcing members 46 desirably extend obliquely between the opposite wheel housings 26 and 27 and have their opposite end portions welded to the inwardly extending portions 43. The transverse channel bar 45 and the oblique and horizontal reinforcing members 46 constitute, together with the channel bars 25 and 32, the transverse structure hereinbefore mentioned interconnecting the opposite wheel housings.

A bracket member for each set of rear wheels rigidly supports the midlength portion of a set of leaf springs 47 and in turn said bracket member is pivotally supported upon the corresponding L-shape bracket 42 for vertical swinging movement. The leaf springs 47 extend longitudinally of the vehicle. Each bracket member consists of a body portion 48 having upstanding, spaced apart ears 49 with alining openings 50, and downwardly extending portion 51 suitably carrying a spring seat 52. Each set of leaf springs lies between a body portion 48 and a spring seat 52, and four screw bolts 53 at the outer sides of the leaf springs extend through the spring seat 52 and enter the body portion 48 to fasten and clamp the leaf springs in the bracket member. The usual rod 54 extends through the leaf springs and enters the upper and lower supports to stabilize said leaf springs. Each bracket member is pivotally supported upon the horizontal arm of the corresponding L-shape bracket 42 by a horizontal stud 55, arranged transversely of the frame, in the openings 50, and surrounded by U-bolts 56 which pass upwardly through a block 57 and said horizontal arm of the corresponding bracket member. Nuts 58 upon the U-bolts 56 clamp the block 57 against the horizontal arm of the bracket member and draw the stud 55 up against said block 57. The lower surface of each block 57 is of curvilinear conformation to nicely seat the corresponding stud 55, and each body portion 48 is slotted, as at 59, to accommodate the U-bolts and allow free rotative movement of the bracket member, as will be understood.

Wheel carrying members 60 are associated with the opposite end portions of each set of leaf springs 47. Each wheel carrying member 60 includes parallel plates 61 and 62 held in spaced relation by reinforcing members 63 welded to the plates. The plate 61 includes an extension portion 64 at its bottom which extends beneath the lower end of the plate 62. Alined openings 65 in the plates 61 and 62 of each wheel carrying member 60 support a shaft 66 for wheels 41. The wheels 41 and the usual brakes and brake drums are mounted upon or about the shafts 66 in any convenient manner.

Anchor beams, one for each wheel carrying member 60, are represented at 67. As disclosed, each anchor beam 67 is an I-beam or member having one of its end portions inserted through an opening 68 in the plate 62 of a wheel carrying member 60 to engage the plate 61, and so that the base of the inserted end portion engages the extension 64. The inserted portion of each anchor beam is welded to the corresponding wheel carrying member. A spring pad 69, one for each anchor beam, is welded or otherwise secured to the base of the inserted portion of the anchor beam, as at 70, to be supported thereby, and the adjacent end portion of a set of leaf springs 47 at the corresponding side of the vehicle rides upon a spring pad 69, the ends of the leaf springs terminating at location between the spring pads and the upper flanges of the anchor beams.

Each bracket member for each set of rear wheels pivotally supports a pair of upper and a pair of lower radius rods, which radius rods are also pivotally attached to the corresponding forward and rearward wheel carrying members 60. In the instance of each upper radius rod 72, an end portion of the radius rod is pivoted, as at 73, between ears upon the body portion 48, and the opposite end portion of the radius rod is pivoted, as at 74, between the plates 61 and 62. In the instance of each lower radius rod 75, an end portion of the radius rod is pivoted, as at 76, between ears upon the downwardly extending portion 51, and the opposite end portion of the radius rod is pivoted, as at 77, upon the plate 62. The pivotal supports 73 and 76 include rubber washers at either side of each radius rod and between the ears to allow slight sidewise resilient swinging movement of the radius rods, for an obvious purpose.

The end of each anchor beam 67 which is spaced from the wheel carrying members 60 to which the anchor beam is secured, is mounted for universal swinging movement in a bearing 78 rigidly supported by the frame at the side thereof opposite said mentioned wheel carrying member, there being one bearing 78 for each anchor beam. The mounting for each anchor beam 67 may be constituted by a ball and socket joint.

It will be apparent that the rear wheels 41 of the vehicle support the frame through the instrumentality of the leaf springs 47 at the opposite sides of the vehicle, said leaf springs resting upon the spring pads 69 and being grasped at their midlengths and securely held by the brackets pivotally supported by the studs 55 upon the L-shape brackets 42 rigid with members of the frame which are in turn rigid with the main channel bars or girders 10 and 11 extending longitudinally of the vehicle. Or, stated differently, the wheel housings 26 and 27 are rigid with the main longitudinal girders of the frame, and the axes for the leaf springs are rigid with said wheel housings. Thus, the weight of the frame is carried to the rear wheels of the vehicle through supporting springs rigidly, but oscillatably, attached to said frame. In some instances the elements 47 need not be springs, but could be non-resilient members having their ends resting upon pads such as 69.

As a forward wheel 41 is caused to change its elevation as it travels over the ground, a rearward wheel 41 at this same side of the vehicle moves in opposite direction, upwardly or downwardly, as the case may be, the whole wheel mounting oscillating on the corresponding stud 55. As the wheels move upwardly and downwardly when running over the ground, to flex the end portions of the leaf springs, the radius rods 72 and 75 swing upwardly and downwardly upon their pivots, as will be evident.

In some instances, anchor beams such as 67 may not be employed, provision being otherwise made for assuring that the wheel carrying members stay assembled with the end portions of the leaf springs. When anchor beams as illustrated and described are employed, they render a very advantageous service, in addition to assuring permanent assembly of the wheel carrying members with the leaf springs.

When a rear wheel 41 bobs up and down under the frame, due to flexing of the leaf spring carrying said wheel, the corresponding anchor beam oscillates in its bearing 78 at the opposite side of the frame. However, as the different sides of the frame have tendency to bob up and down, to thus have tendency to alter the elevations of the brackets supporting the opposite springs, the anchor beams perform a load stabilizing service. That is to say, the anchor beams 67 are load stabilizing members adapted to reduce sidewise pitching or rocking or jolting movement of the vehicle frame to a minimum. More specifically, suppose one side of the frame of the vehicle to be moved downwardly, due to a vertical thrust at this side, to an extent greater than the opposite side of said frame. This vertical thrust will be imparted as well to the wheels at the corresponding side of the frame and to the ends of the anchor beams rigid with the wheel carrying members, through the instrumentality of the leaf springs at this same side of the frame, as will be obvious. The downward vertical movement of one side of the frame will cause the wheel carrying members and the anchor beams rigid therewith to move downwardly as an integral unit, and this downward movement will be imparted to the opposite side of the frame through the instrumentality of said anchor beams, the downward force being applied at the bearings 78, which cannot under such condition allow pivotal movement of the anchor beams because said anchor beams and their pivoted ends are actually moved downwardly and not swung relatively to the frame as when the wheels bob up and down under the frame. Or, stated differently, any downward movement at a side of the frame of the vehicle sufficient to move the end of an anchor beam attached at this same side of the frame downwardly with the frame more or less as a unit, will cause resultant downward movement of the opposite side of the frame, through the anchor beam which was moved downwardly, and thus reduce sidewise rocking or jolting movement of the vehicle or semi-trailer to a minimum. At the same time, ordinary bobbing of the rear wheels of the vehicle allowing it to continue its course at an approximately even keel or level elevation, is cared for by the leaf springs and the greatly improved wheel mounting as illustrated and described, allowing easy pivotal movement of the anchor beams in response to the bobbing of the wheels or to oscillation of the wheel supports upon the studs 55 as uneven ground is passed over.

After tendency toward a jolting movement at a side of the frame, a natural rebound occurs to cause this side of the frame to be elevated. Obviously, the wheel supports at this same side of the frame have this rebound movement imparted to them, and through the anchor beams rigidly attached to said wheel supports the upward reaction is imparted to the opposite side of the frame, in the same general manner as already set forth. Thus, upon tendency toward either upward or downward movement of one side only of the frame of the vehicle; or tendency of either side toward movement to above or below an approximately level and natural elevation of said frame; there is reaction through the anchor beams rigid with the wheel supports at one side of the frame and pivoted to the opposite side of said frame to cause said opposite side to move in a like direction tending always to keep the vehicle on an even keel, rocking towards neither right nor left. In the transportation of oil or other liquid upon wheel supporting mechanisms incorporating the principles as illustrated and described, there is but little tendency toward causing the liquid to splash over due to any sidewise rocking or tilting of the vehicle. Sidewise surging of the liquid is reduced to a minimum.

When the vehicle is under no load, the wheels 41 will be at slightly different angle than when said vehicle is under load. The arrangement is such that when the vehicle is out of use, the rear wheels slant slightly to the vertical, downwardly and inwardly, due to the fact that the frame and hence the pivoted ends of the anchor beams are at their highest elevation when there is no load. When a load is applied, the frame carries the weight against the leaf springs and moves downwardly slightly. This moves the pivoted ends of the anchor beams downwardly to correspond, and, through the instrumentality of the anchor beams and the wheel supports, swings the wheels to vertical position, as will be understood.

In some instances, the wheel supporting structure may include mechanism for carrying but a single rear wheel at either side of the vehicle. In such case the brackets for the leaf springs 47 would be made rigid with the frame and not oscillatable thereon, and but one end of each leaf spring would be employed to support a wheel carrying member, in some instances perhaps attached to an anchor beam such as 67, and in some instances perhaps having no anchor beam.

The propulsion or draft of the vehicle or semi-trailer is along a longitudinal way extending, generally, upwardly from the rear wheel axles through the wheel housings to the main channel bars or girders 10 and 11, and thence along said main channel bars or girders and the arc-shaped channel bar 15 to the king pin 18, so that the advancing or propelling action upon the rear wheels is in a general downward direction assuring the maximum in traction. That is, the king pin 18 is at elevation above the rear wheel axles, and the draft is longitudinally rearwardly through the frame, perpendicularly along the main channel bars or girders 10 and 11, thence downwardly through rigid members to the studs 55, and thence to the wheel axles.

An oil tank for the vehicle is indicated at 79, and transverse supports for said oil tank are represented at 80, 81, 82, and 83. The support 80 is as disclosed an angle bar at the rear of the vehicle, just in front of the channel bar 25, having its rearward vertical arm welded to said channel bar 25 and the opposite end portions of its forward, substantially horizontal arm welded to the oppositely disposed, inwardly extending lower portions 43 on the plates 39 which support the L-shape brackets 42. The support 81 is as disclosed an angle bar, at the location of the channel bar 45, having its forward vertical arm welded to said channel bar 45 and the opposite end portions of its rearward, substantially horizontal arm suitably welded to the wheel housings. The angle bar 81 extends the full width between the lower portions of the oppositely disposed wheel housings and the opposite end portions of the substantially horizontal arm of said angle bar 81 are in close proximity to or contiguous with the inwardly extending portions 43. Said angle bar 81 may be welded to adjacent ends of the oblique reinforcing members 46. The support 82 is as disclosed an angle bar, at the location of the channel bar 32, having its forward vertical arm welded to the upper, forwardly extending flange of said channel bar 32 and the opposite end portions of its rearward, substantially horizontal arm welded to the oppositely disposed vertical plates 28 and 29 and to vertical angle pieces 84 carried by the channel bars 30 and 31. The support 83 is as disclosed an angle bar, at the location of the small front wheels 36, having its forward vertical arm welded to the transverse member 35 and the opposite end portions of its rearward, substantially horizontal arm welded to the oppositely disposed vertical channel bars 33 and 34. All of the angle bars 80, 81, 82 and 83 slant downwardly slightly from their outer ends to their midlengths, all denoted 85, and the midlengths 85 of said mentioned angle bars are in longitudinal alinement with each other at the transverse center of the vehicle. Said midlengths 85 of the angle bars 80, 81, 82, and 83 are at about the elevation of the wheel centers, and said angle bars slant upwardly from their centers outwardly toward the opposite sides of the vehicle so that their outer ends are all at the same elevaton, which elevation is a little above the elevation of the elements 25, 45, 32, and 35.

The oil tank 79 is seated, removably or otherwise, in the vehicle frame. As disclosed, said oil tank includes a forward portion 86, in advance of the vertical channel bars 33 and 34, of relatively shallow depth which rests upon the channel bars 16. The upper surfaces of said channel bars 16 are below the elevation of the upper edges of the channel bars 10, 11, and 15 and are flat, and the base of the forward portion 86 of the oil tank is also flat to engage squarely against the channel bars 16. Said oil tank includes a rearward portion 87, extending from the forward portion 86 to the rear of the vehicle, of relatively great depth which rests upon the angle bars 80, 81, 82, and 83. The base of the rearward portion 87 is of configuration to rest squarely upon all of the angle bars 80, 81, 82, and 83 as in a saddle, and to this end slants downwardly and inwardly in the same manner and at the same angle as do said angle bars 80, 81, 82, and 83, the lowermost part of said base of said rearward portion 87 extending longitudinally of the vehicle at the transverse center thereof and engaging all of the midlength portions 85 of the angle bars 80, 81, 82, and 83.

The upper part or top of the oil tank 79, including the upper part of each of the forward portion 86 and the rearward portion 87, may extend in a substantially horizontal plane for the full length of the vehicle, and may terminate at elevation somewhat above the channel bars 10, 11 and 15. As disclosed, the upper wall 88 of said oil tank is of slightly curvilinear conformation, as will be more clear from Fig. 3. At its opposite sides and ends said upper wall 88 merges into substantially vertical, downwardly extending side and end walls, denoted 89 and 90, respectively, which are closely adjacent to or contiguous with all of the channel bars 10, 11, 15, and 24. That is to say, the side walls and end walls of the upper part of the oil tank are closely fitted to the side and end frame members 10, 11, 15, and 24 of the vehicle, the rearward end of the oil tank being of rectilinear conformation and the forward end being of arc or curvilinear shape to follow the contour of the channel bar 15.

The rearward portion 87 of the oil tank includes a forward, lower part 91, disposed forwardly of the elements 28, 29, 30, and 31, having side walls which are in the vertical planes of the side walls 89. To the rear of said forward, lower part 91 said side walls are curved downwardly and inwardly, as at 92 in Fig. 3, to fit the downwardly and inwardly curved brackets 38 of the wheel housings 26 and 27. The end wall 90 of the oil tank at the rear of the vehicle continues vertically to the rearward edges of the downwardly and inwardly curved portions 92 and the rearward edge of the base of said oil tank. At the forward portion of each wheel housing each downwardly and inwardly curved portion 92 merges into a transverse auxiliary end wall 93, one adjacent and fitting about each vertical plate 28, 29. The outer edge of each auxiliary end wall 93 merges into the rearward edge of the lower portion of a side wall 89, and the lower edge of each wall 93 merges into the base of the oil tank. See Fig. 6 in connection with Fig. 2.

It will be seen that by the construction and arrangement as set forth, there is provision for mounting the oil tank, or the rearward portion 87 thereof, so that the base or lower portion of said tank is at as low elevation as the wheel centers, and this without in any way interfering with the mounting mechanism for the vehicle. The advantages of so mounting an oil tank will be obvious. A tank vehicle of construction as illustrated and described can transport considerably more material or liquid than can a more or less similar vehicle of structure heretofore known and having substantially the same overall vehicle dimensions. And, at the same time, in the present tank vehicle, the fluid load is transported relatively close to the ground, thereby assuring stability of the vehicle and its load and minimizing liability of swaying or rocking.

To further insure stability, the oil tank 79 may be fastened down by a series of straps 94 spaced apart along the length of the vehicle. As disclosed, each strap 94 is a continuous strip of metal extending transversely across the top of the oil tank. Each end of each strap integrally carries a bolt 95, the bolts on the opposite ends of a strap are inserted downwardly through openings in the upper flanges of opposite channel bars 10 and 11, and nuts 96, one on each bolt, are turned up tightly against the lower surfaces of said upper flanges having said bolts to rigidly fasten or clamp each strap 94 against the oil tank, and, in turn, force said tank down against its supports upon the vehicle. Thus, the straps 94 cooperate with the oil tank to, in effect, constitute transverse reinforcing members for the vehicle frame.

What is claimed is:

1. A tank vehicle comprising a vehicle frame including spaced apart, longitudinally extending girder members at opposite sides of the frame and a wheel housing rigid with a lower portion of each girder member and extending downwardly and inwardly, wheels for said frame at opposite sides thereof, mounting means for the wheels at each side of the frame attached to at the outer sides of said frame and the outer sides of said wheel housings, and a tank for material spanning the space between said longitudinally extending girder members and supported by said wheel housings.

2. A tank vehicle comprising a vehicle frame including spaced apart, longitudinally extending girder members at opposite sides of the frame, a wheel housing rigid with a lower portion of each girder member and extending downwardly and inwardly and frame members at the front and rear of said vehicle connecting said girder members to each other, wheels for said frame at the opposite sides thereof, mounting means for said wheels attached to each side of the frame at the sides of said wheel housings adjacent the outer sides of the frame, and a tank for material seated in said frame to fill the area defined by all of said longitudinally extending girder members and front and rear members, said tank including a lower portion thereof supported by and spanning the distance between said wheel housings.

3. A tank vehicle comprising a vehicle frame including spaced apart, integrally connected side frame members, wheel housings at opposite sides of the vehicle and extending downwardly and inwardly from said side frame members, wheels and mounting means therefor at the opposite sides of the vehicle and at the outer sides of said wheel housings, and a tank for material spanning the space between the frame members and supported by said frame, said tank including a lower portion thereof fitted to said wheel housings.

4. A tank vehicle comprising a vehicle frame including spaced apart side frame members, means integrally connecting said side frame members to each other, wheel housings at opposite sides of the vehicle and extending downwardly and inwardly from said side frame members, wheels and mounting means therefor at the opposite sides of the vehicle and at the outer sides of said wheel housings, a tank for material spanning the space between the frame members and extending therebelow, and a support for said tank approximately at the elevation of the wheel centers, said tank including a lower portion thereof fitted to said wheel housings.

5. A tank vehicle comprising a vehicle frame including spaced apart, longitudinally extending girder members at opposite sides of said frame and means integrally connecting said girder members to each other, wheel housings integral with the girder members and extending downwardly and inwardly therefrom, wheels and mounting means therefor at the opposite sides of the vehicle and at the outer sides of said wheel housings, said mounting means being connected to said wheel housings, and a tank for material spanning the space between said girder members and extending therebelow, said tank being supported by said frame, and a lower portion of the tank spanning the space between and being fitted to said wheel housings.

6. A tank vehicle comprising a vehicle frame including spaced apart, integrally connected, longitudinally extending girder members at opposite sides of the vehicle, wheel housings integral with said girder members and extending downwardly and inwardly therefrom, wheels and mounting means therefor at the opposite sides of the vehicle and at the outer sides of the wheel housings, said mounting means being secured to said wheel housings, and a tank for material spanning the space between said girder members and extending downwardly, said tank being supported by said frame, a lower forwardly disposed portion of the tank having width about equal to the distance between said girder members, and a lower rearward portion of the tank spanning the distance between and being fitted about said wheel housings.

7. A tank vehicle comprising a vehicle frame including spaced apart, integrally connected, longitudinally extending girder members at opposite sides of the vehicle, wheel housings integral with said girder members and extending downwardly and inwardly therefrom, wheels and mounting means therefor at the opposite sides of the vehicle and at the outer sides of the wheel housings, said mounting means being secured to said wheel housings, and a tank for material spanning the space between said girder members and extending downwardly, said tank being supported by said frame, a lower forward portion of the tank having width about equal to the distance between said girder members and terminating at its bottom in the plane of the girder members, a lower intermediate portion of the tank having width about equal to the distance between the girder members and terminating at its bottom in the plane of lower parts of said wheel housings, and a lower rearward portion of the tank spanning the space between and being fitted about said wheel housings.

8. A tank vehicle comprising a vehicle frame including spaced apart, integrally connected, longitudinally extending girder members at opposite sides of the vehicle, wheel housings integral with said girder members and extending downwardly and inwardly therefrom, wheels and mounting means therefor at the opposite sides of the vehicle and at the outer sides of the wheel housings, said mounting means being secured to said wheel housings, a tank for material spanning the space between said girder members and extending downwardly, a lower forwardly disposed portion of the tank having width about equal to the distance between said girder members, and a lower rearward portion of the tank spanning the space between and being fitted about said wheel housing, and supports on said frame for the base of said tank.

9. A tank vehicle comprising a vehicle frame including spaced apart, integrally connected, longitudinally extending girder members at opposite sides of the vehicle, wheel housings integral with said girder members and extending downwardly and inwardly therefrom, wheels and mounting means therefor at the opposite sides of the vehicle and at the outer sides of the wheel housings, said mounting means being secured to said wheel housings, a tank for material spanning the space between said girder members and extending downwardly, a lower forward portion of the tank having width about equal to the distance between said girder members and terminating at its bottom in the plane of the girder members, a lower intermediate portion of the tank having width about equal to the distance between the girder members and terminating at its bottom in the plane of lower parts of said wheel housings, and a lower rearward portion of the tank spanning the space between and being fitted about said wheel housings, and supports on said frame for the base of said tank.

10. A tank vehicle comprising a vehicle frame including spaced apart, longitudinally extending girder members at opposite sides of the vehicle, wheel housings integral with said girder members and extending downwardly and inwardly therefrom, a vertical, transverse member at the front and at the rear of each wheel housing, each vertical, transverse member being secured to a wheel housing and to a girder member, transverse front and rear members integrally connecting opposite girder members to each other, wheels and mounting means therefor at the opposite sides of the vehicle and at the outer sides of the wheel housings, said mounting means being secured to said wheel housings, a tank for material mounted in the area enclosed by said girder members and said front and rear transverse members and extending downwardly, a lower portion of said tank spanning the space between and being fitted about said wheel housings, and transverse supports on said frame for the base of said tank, said transverse supports including members for reinforcing said wheel housings and extending therebetween.

11. A tank vehicle comprising a vehicle frame including spaced apart, integrally connected, longitudinally extending girder members at opposite sides of the vehicle, wheel housings integral with said girder members and extending downwardly and inwardly therefrom, wheels and mounting means therefor at the opposite sides of the vehicle and at the outer sides of the wheel housings, said mounting means being secured to said wheel housings, a tank for material spanning the space between and extending upwardly above and downwardly below said girder members, transverse supports for said tank including reinforcing members extending between the wheel housings, a lower portion of said tank resting upon said transverse supports and spanning the space between and being fitted about said wheel housings, spaced apart members arranged over said tank, and means for fastening said members to said frame to clamp down said tank.

12. A tank vehicle comprising a vehicle frame including spaced apart, integrally connected, longitudinally extending girder members at opposite sides of the vehicle, wheel housings integral with said girder members and extending downwardly and inwardly therefrom, wheels and mounting means therefor at the opposite sides of the vehicle and at the outer sides of the wheel housings, said mounting means being secured to said wheel housings, a tank for material spanning the space between and extending upwardly above and downwardly below said girder members, transverse supports for said tank including reinforcing members extending between the wheel housings, a lower portion of said tank resting upon said transverse supports and spanning the space between and being fitted about said wheel housings, spaced apart, endless straps extending transversely over the upper surface of said tank, and means for adjustably securing the opposite ends of each strap to opposite girder members, whereby to clamp the tank down against said frame.

13. A tank vehicle comprising a vehicle frame including spaced apart, rigidly connected frame members, wheel housings at the opposite sides of the vehicle and extending downwardly and inwardly from said frame members, a reinforcing member extending between lower portions of opposite wheel housings, wheels at the opposite sides of said vehicle and at the outer sides of said wheel housings, and a tank for material supported by said frame and including a lower portion of the tank between and supported by said wheel housings and a bottom portion of said tank supported by said reinforcing member.

14. A tank vehicle comprising a vehicle frame including spaced apart, rigidly connected frame members, wheel housings at the opposite sides of the vehicle and extending downwardly and inwardly from said frame members, wheels at the opposite sides of said vehicle and at the outer sides of said wheel housings, and a tank for material including a portion thereof between and supported by said wheel housings.

15. A tank vehicle comprising a vehicle frame including spaced apart, rigidly connected, longitudinally extending frame members at opposite sides of the vehicle, wheel housings rigid with said frame members and extending downwardly and inwardly therefrom, wheels and mounting means therefor at the opposite sides of the vehicle and at the outer sides of the wheel housings, said mounting means being secured to said wheel housings, and a tank for material including a portion thereof between and supported by said wheel housings.

16. A tank vehicle comprising a vehicle frame including spaced apart, longitudinally extending frame members at the opposite sides of the vehicle, wheel supporting members extending downwardly from said frame members and rigid therewith, wheels and mounting means therefor at the opposite sides of the vehicle and at the outer sides of the wheel supporting members, said mounting means being secured to said wheel supporting members, and a tank for material supported by said frame and including a portion of the tank between said wheel supporting members.

17. A tank vehicle comprising a vehicle frame including spaced apart, rigidly connected, longitudinally extending frame members at opposite sides of the vehicle, wheel housings rigid with said frame members and extending downwardly and inwardly therefrom, wheels and mounting means therefor at the opposite sides of the vehicle and at the outer sides of the wheel housings, said mounting means being secured to said wheel housings, a tank for material supported by said frame and including a portion of the tank between said wheel housings, and means for securing said tank down upon said frame.

ROY B. SIMNING.